(No Model.) 2 Sheets—Sheet 1.
M. TURTON.
PIPE AND ROD ADJUSTER FOR PUMPING MECHANISM FOR OIL WELLS.
No. 466,638. Patented Jan. 5, 1892.
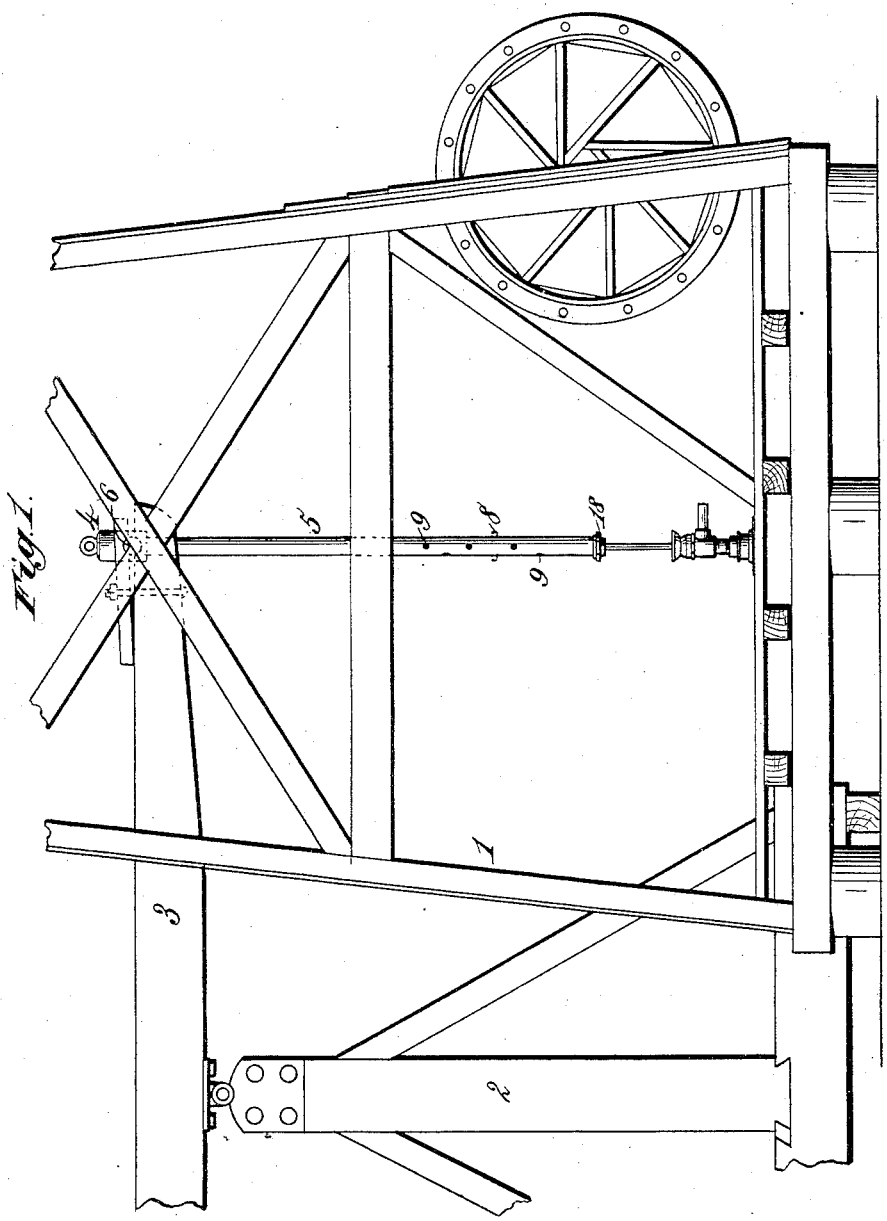

(No Model.) 2 Sheets—Sheet 2.
M. TURTON.
PIPE AND ROD ADJUSTER FOR PUMPING MECHANISM FOR OIL WELLS.
No. 466,638. Patented Jan. 5, 1892.
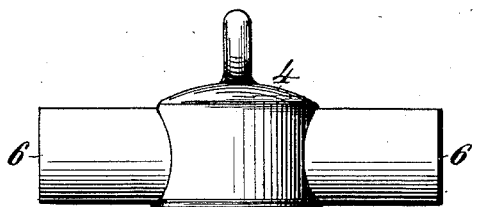
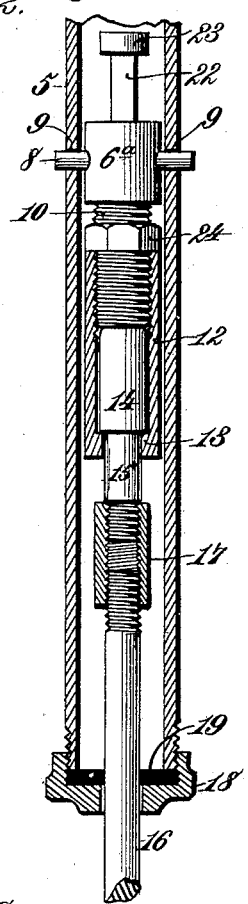
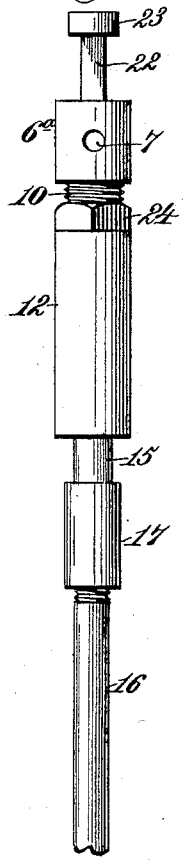
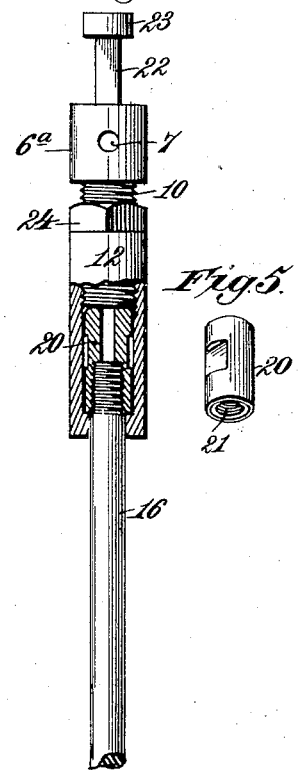
Witnesses.
Inventor.
Mordecai Turton
By James L. Norris Atty.

UNITED STATES PATENT OFFICE.

MORDECAI TURTON, OF JERRY CITY, OHIO.

PIPE AND ROD ADJUSTER FOR PUMPING MECHANISM FOR OIL-WELLS.

SPECIFICATION forming part of Letters Patent No. 466,638, dated January 5, 1892.

Application filed October 6, 1891. Serial No. 407,915. (No model.)

*To all whom it may concern:*

Be it known that I, MORDECAI TURTON, a citizen of the United States, residing at Jerry City, in the county of Wood and State of Ohio, have invented new and useful Improvements in Pipe and Rod Adjusters for Pumping Mechanism for Oil-Wells, of which the following is a specification.

My invention relates to pumping apparatus for oil-wells, my purpose being to provide what I term a "pipe and rod adjuster," which shall afford a simple, easy, and complete adjustment of the pump-rod to the various positions of the pump-valves, and give a positive attachment of the polish-rod to the adjuster and of the adjuster to the pipe. It is my purpose, in other words, to provide a means of connection between the polish-rod and the pipe, which latter is connected with the end of the walking-beam by a cross-head or in any other suitable manner, said connection being wholly positive, in contradistinction to a clamp or friction-grip, which latter is thought by some pumpers to be insecure when subjected to the heavy strains which are sometimes imposed.

It is one purpose of my invention, also, to provide a connection of this type which shall be readily adjustable under all circumstances, which shall be of great strength, and have such positive character that no slip can possibly occur and in which the construction and the number of parts are of such simplicity and so few in number that the device can be made and sold at an extremely low price.

It is my further purpose to provide an adjustable connection of the kind described and to combine therewith simple means of ordinary character for positively connecting the same at any required point within the pipe on the walking-beam and for preventing the rattling and play of the pipe and rod relatively to each other.

It is my purpose, finally, to provide means forming part of my adjuster for facilitating the speedy removal of the rod, enabling the pumper to pull it up without the attachment of specially-constructed parts.

The invention consists in the several novel features of construction and new combinations of parts, all as hereinafter described, and then more particularly pointed out and defined in the claims which follow the description and conclude this specification.

To enable others skilled in the art to make, construct, and use my said invention, I will proceed to describe the same in detail, reference being had to the accompanying drawings, in which—

Figure 1 is a sectional elevation showing part of a pumping-rig provided with my invention. Fig. 2 is a sectional elevation showing the cross-head removed from the walking-beam, the pipe depending from the cross-head, the adjuster arranged within the pipe, and the upper portion of the polish-rod. Fig. 3 is a side elevation of the adjuster and its adjuncts, shown in Fig. 2, removed from the pipe. Fig. 4 is a sectional elevation of the parts shown in Fig. 3 with the substitution, however, of a modified construction for the attachment of the polish-rod. Fig. 5 is a perspective view of a modified form of coupling.

The reference-numeral 1 in said drawings denotes the foundation-frame; 2, the samson-post, and 3 the walking-beam of an ordinary pumping-rig, these parts being of any ordinary or known construction. Upon the end of the walking-beam is mounted the cross-head consisting of a central portion 4, having an internally-threaded recess which receives the end of the pipe 5, and laterally-projecting trunnion-pins 6, arranged in seats formed in the upper face of the end of the beam, or in a metallic face-plate thereon. The pipe 5 is screwed into the central portion 4 of the cross-head, the construction closely resembling that shown in my patent of January 20, 1891, No. 445,100, the only essential difference being that the central portion 4 is reduced in height to economize in the weight of metal.

The wrought-iron pipe 5 is so well known in the art that its construction and dimensions require no specific mention. I will state, however, that I use a pipe of two inches interior diameter, which renders it practicable to employ a length of the ordinary well-tubing, it being only necessary to cut it to the required length and cut an external or male thread on each end.

Within the pipe 5 is arranged the adjuster, which consists of a cylindrical head $6^a$, which fits the pipe closely, but not so closely as to interfere with its longitudinal movement or adjustment in the pipe. In this head is formed a diametrical opening 7, which receives a cross-pin 8, insertible in openings 9 in the pipe 5. These openings are made at suitable intervals, so that the necessary adjustment may be had, the alternate openings being preferably parallel with each other and at right angles with those lying between them.

Depending from the head 6ª is a reduced portion 10, having an external thread. This reduced portion enters an internally-threaded sleeve 12, which closely fits the pipe 5, but moves easily therein. At its lower end this sleeve is provided with an inwardly-projecting narrow collar or flange 13 of proper thickness, upon which rests a coupling-piece 14, having a reduced end or portion 15, which passes through the aperture formed by the collar or flange 13, and projects a short distance below the end of the sleeve. To its lower end, which has a left-hand thread, the polish-rod 16 is connected by means of a coupling 17. The polish-rod passes out of the lower end of the pipe 5, where it is surrounded by a screw-cap 18 and a rubber or other flexible or elastic cushion or washer 19, which is clamped between the screw-cap 18 and the end of the pipe 5.

I may substitute for the coupling piece or plug 14 a single cylindrical plug 20, having an internally-threaded recess or bore 21 in its lower end of such diameter as to receive the threaded end of the polish-rod 16, the opening surrounded by the collar or flange 13 being of such diameter as to admit the polish-rod. In principle this construction is not different from that seen in Fig. 2, but it has the advantage of simplicity and cheapness.

Upon the upper end of the adjuster-head 6ª is formed or rigidly mounted a reduced vertical bar 22, having an enlarged head or upper extremity 23. The bar is usually though not necessarily rectangular and short, the purpose being to provide a construction to facilitate the pulling up of the pump-rod by simply hooking the elevator on and hoisting.

In order to provide for the rigid retention of the threaded reduced portion 10 at any point, I employ a jam-nut or lock-nut 24, which is turned down against the end of the sleeve 12 when the parts are properly adjusted. For example, I may screw the threaded portion 10 down until its end abuts against the coupling-piece 14 and then adjust the jam-nut, thus locking the parts as rigidly as if formed in one piece. When a slight play is desired, however, the part 10 may be slightly withdrawn.

What I claim is—

1. In a pumping-rig for oil-wells, a pipe and rod adjuster consisting of an adjustable head having a reduced externally-threaded portion depending from its lower end, an internally-threaded sleeve having an internal collar or flange at its lower end, a coupling piece or plug filling the lower part of the sleeve and coupled to the polish-rod, and a pipe of ordinary diameter attached to the cross-head and containing said parts, the lower end being provided with a cap through which the polish-rod passes, substantially as described.

2. In a pumping-rig for oil-wells, the combination, with a pipe attached to the cross-head and having a screw-cap and elastic or flexible cushion at its lower end, of a coupling piece or plug having a reduced portion with a left thread on its lower end, a sleeve fitting the pipe and having means for supporting the coupling-piece within it, an adjuster-head also fitting the pipe and having a threaded reduced part screwed into the sleeve, and means for locking the same, the head having a diametrical opening to receive a cross-pin, which engages one of a series of openings in the pipe, substantially as described.

In testimony whereof I have hereunto set my hand and affixed my seal in presence of two subscribing witnesses.

MORDECAI TURTON. [L. S.]

Witnesses:
JAMES A. RUTHERFORD,
CHAS. B. TILDEN.